US008958981B2

(12) United States Patent
Wang

(10) Patent No.: US 8,958,981 B2
(45) Date of Patent: Feb. 17, 2015

(54) NEAR FIELD COMMUNICATION MOBILE DEVICE AND NAVIGATION DEVICE COMMUNICATION SYSTEM

(71) Applicant: Cheng-Yu Wang, Taipei (TW)

(72) Inventor: Cheng-Yu Wang, Taipei (TW)

( * ) Notice: Subject to any disclaimer, the term of this patent is extended or adjusted under 35 U.S.C. 154(b) by 274 days.

(21) Appl. No.: 13/670,031

(22) Filed: Nov. 6, 2012

(65) Prior Publication Data

US 2014/0129133 A1 May 8, 2014

(51) Int. Cl.
*G08G 1/123* (2006.01)
*G01C 21/36* (2006.01)

(52) U.S. Cl.
CPC .................................... *G01C 21/362* (2013.01)
USPC .......................................................... 701/409

(58) Field of Classification Search
USPC .................. 701/400, 409, 484, 491, 526, 541
See application file for complete search history.

(56) References Cited

U.S. PATENT DOCUMENTS

2011/0021211 A1* 1/2011 Ohki .......................... 455/456.3
2011/0302249 A1* 12/2011 Orr et al. ....................... 709/206
2013/0007173 A1* 1/2013 Klassen ........................ 709/206

* cited by examiner

*Primary Examiner* — Kim T Nguyen
(74) *Attorney, Agent, or Firm* — Muncy, Geissler, Olds & Lowe, P.C.

(57) ABSTRACT

A mobile device and navigation device communication system utilizing near field communication to easily capture and transfer address data and simplify programming of the navigation device is disclosed. When a mobile device receives a text message a mobile navigation communication application determines if there is an address included in the text message and if found extracts the address and encodes the address. The user then places the mobile device in close proximity to the navigation device and the data exchange is performed via near field communication. After the data exchange is complete the navigation device decodes the data into the address and searches its database to find an address match. The navigation device then displays the address for the user to confirm. After confirmation the navigation device displays the route or driving directs from the user's current location to the destination address.

20 Claims, 13 Drawing Sheets

10

20

Mobile Device NFC

40

NFC

30

Navigation Device NFC

NEAR FIELD COMMUNICATION MOBILE DEVICE AND NAVIGATION DEVICE COMMUNICATION SYSTEM

BACKGROUND OF THE INVENTION

1. Field of the Invention

The present invention relates to navigational systems. More specifically, the present invention discloses a mobile device and navigation device communication system utilizing near field communication to easily capture and transfer address data and simplify programming of the navigation device.

2. Description of the Prior Art

Navigation devices are used in vehicles to provide driving directions to the driver of the vehicle. In order to use, the conventional navigation device must be programmed with the desired destination address. This requires the driver to input text and numbers and search through menus in order to enter the destination address.

The multiple steps required to enter the address and program the navigation device is not only time consuming but also frustrating.

Additionally, the steps to program the navigation device are also potentially dangerous for the driver and passengers if the driver is distracted programming while driving.

Furthermore, if the driver is receiving directions from a friend over their mobile phone, the driver is further distracted while using the mobile phone while trying to program the navigation device. Distracted driving is very dangerous and potentially fatal accidents can easily occur.

Therefore, there is need for an improved means of easily programming a navigation device by using a mobile device and near field communication.

SUMMARY OF THE INVENTION

To achieve these and other advantages and in order to overcome the disadvantages of the conventional method in accordance with the purpose of the invention as embodied and broadly described herein, the present invention provides a mobile device and navigation device communication system utilizing near field communication to easily capture and transfer address data and simplify programming of the navigation device.

The present invention assists drivers and reduces driving distractions when programming the navigation device.

The mobile device and navigation device communication system comprises a mobile navigation communication (MNC) application installed on an near field communication (NFC) capable mobile device such as, for example a smart phone or a tablet computer. The MNC application is loaded at startup of the mobile device and continues running in the background.

The navigation device is also NFC capable, either originally or with an NFC module comprising an NFC receiver or transceiver incorporated into a smart card (flash card).

When the mobile device receives a text message the MNC application determines if there is an address included in the text message. If there is a message in the text message the MNC application extracts the address and encodes the address into a message such as, for example, a message in NFC data exchange format and notifies the user that an address is ready to be transferred to the navigation device.

The user then places the mobile device in close proximity to the navigation device and the data exchange is performed via NFC.

After the data exchange is complete the navigation device decodes the data into the address and searches its database to find an address match. The navigation device then displays the address for the user to confirm. After confirmation the navigation device displays the route or driving directs from the user's current location to the destination address.

As a result, the user can receive a message containing an address and the MNC application will automatically prepare the address for transfer to the navigation device. The user then simply places the mobile device near the navigation device and the address is transferred to, decoded by, and displayed on the navigation device without the driver having to locate the address in the text message and manually program the navigation device.

The present invention is not only more convenient but also far more safe for users by preventing distractions while driving.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
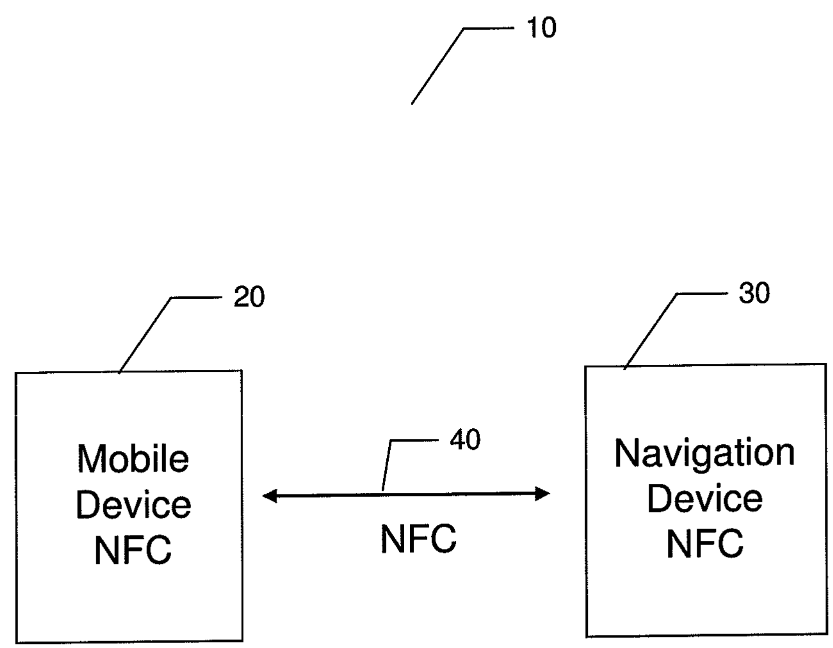
FIG. 1A is a drawing illustrating architecture of a mobile device and navigation device near field communication system according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1A, which is a drawing illustrating a system architecture of a mobile device and navigation device near field communication system according to an embodiment of the present invention.

In the embodiment of the present invention illustrated in FIG. 1A the system architecture 10 comprises a mobile device 20 and a navigation device 30. The mobile device 20 comprises, for example, a mobile smartphone or a portable computer. The mobile device 20 has built-in NFC capability.

The navigation device 30 comprises a vehicle navigation system that assists the driver in navigation. The navigation device 30 comprises software and an electronic display for showing maps, routes, locations, positions, and addresses. The navigation device 30 is typically installed on the front dashboard of the vehicle in close proximity to the driver.

The navigation device 30 is also capable of determining the vehicles location using, for example, sensors, maps, or data from external sources and provides suggested routes, driving directions, traffic conditions, and alternative directions or routes.

In the embodiment illustrated in FIG. 1A the navigation device 30 has built-in NFC capability for allowing the mobile device 20 and the navigation device 30 to communicate and exchange data using NFC 40. NFC 40 allows the mobile device 20 and the navigation device 30 to establish radio communication with each other by touching them together or bringing the mobile device 20 into close proximity with the navigation device 30.

The mobile device 20 further comprises a mobile navigation communication (MNC) application installed on the mobile device 20. The mobile navigation communication application allows a destination address to be extracted from other messaging applications running on the mobile device 20. For example, a destination address is identified and extracted from a short message service (SMS) message, an instant message, an email, a map such as a Google map, or a contact entry. Once the destination address is identified and extracted, the address is encoded by the mobile navigation communication application and sent to the navigation device 30 via NFC 40.

When the navigation device 30 receives the encoded address, the navigation device 30 decodes the address and displays the location, route, and/or driving directions to the address's location.

In this way, the present invention allows a driver to easily receive an address on the mobile device 20 and enter the address into the navigation device 30 without having to type in an address on the navigation device 30.

Figure 1B:
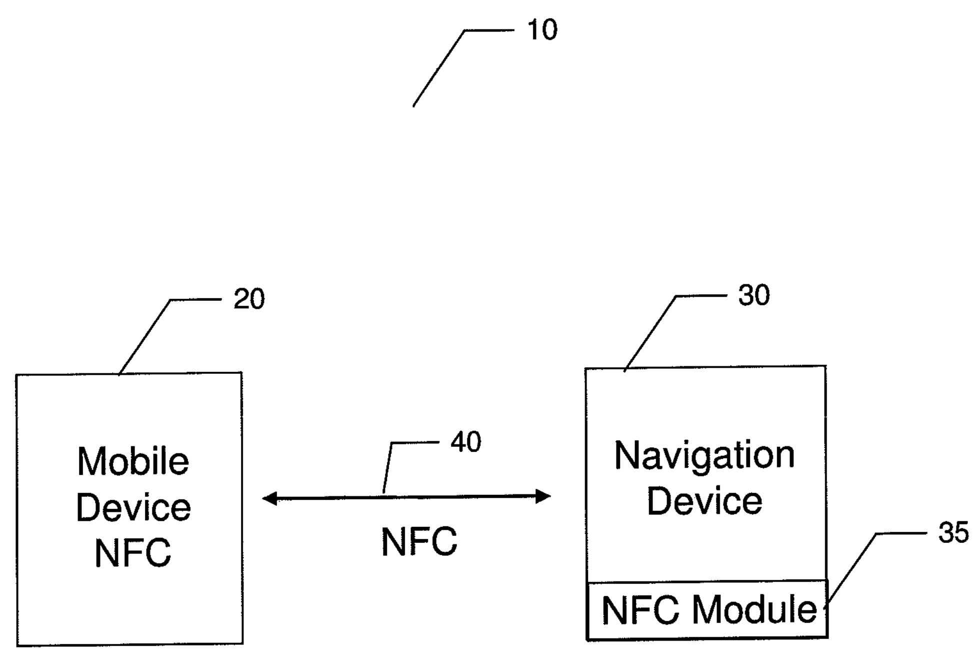
FIG. 1B is a drawing illustrating architecture of a mobile device and navigation device near field communication system according to an embodiment of the present invention.

Refer to FIG. 1B, which is a drawing illustrating a system architecture of a mobile device and navigation device near field communication system according to an embodiment of the present invention.

The embodiment illustrated in FIG. 1B is similar to the embodiment of FIG. 1A however, in the embodiment illustrated in FIG. 1B the navigation device 30 does not have built-in NFC capability. Rather, in this embodiment an NFC module 35 is provided as an add-on after market device for the navigation device 30.

The NFC module 35 comprises, for example, an NFC transceiver in a smartcard such as a MicroSD card. The NFC module 35 is inserted into a card slot on the navigation device 30 and adds NFC capability and functionality to the navigation device 30.

Figure 1C:
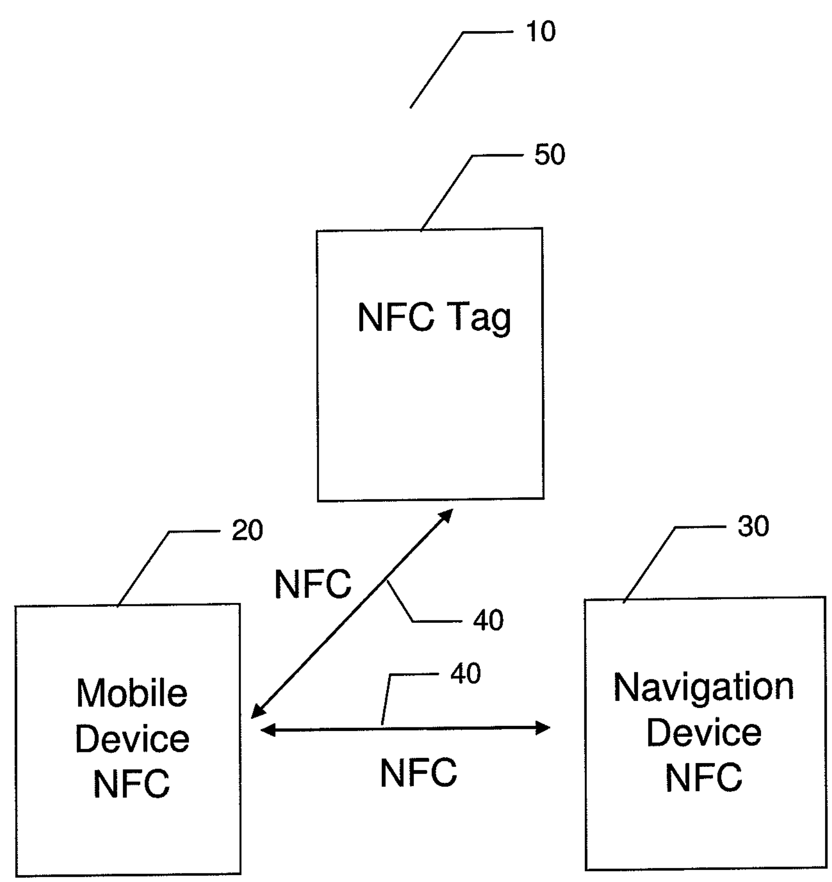
FIG. 1C is a drawing illustrating architecture of a mobile device and navigation device near field communication system according to an embodiment of the present invention.

Refer to FIG. 1C, which is a drawing illustrating a system architecture of a mobile device and navigation device near field communication system according to an embodiment of the present invention.

In the embodiment illustrated in FIG. 1C, the system architecture 10 further comprises an NFC tag 50. The NFC tag 50 comprises, for example, a radio frequency (RF) tag or an RF identification (RFID) tag.

The NFC tag 50 enables the mobile navigation communication (MNC) application to take appropriate actions when the mobile device 20 is in close proximity to the NFC tag 50. For example, when a driver receives an incoming message which might contain an address, the driver places the mobile device 20 near the NFC tag 50. The mobile navigation communication application discovers the NFC tag 50 and reads data from it and informs the mobile navigation communication application to begin operation. Use of the NFC tag 50 reduces false operations in cases where there are other NFC enabled tags in the vehicle.

Figure 2A:
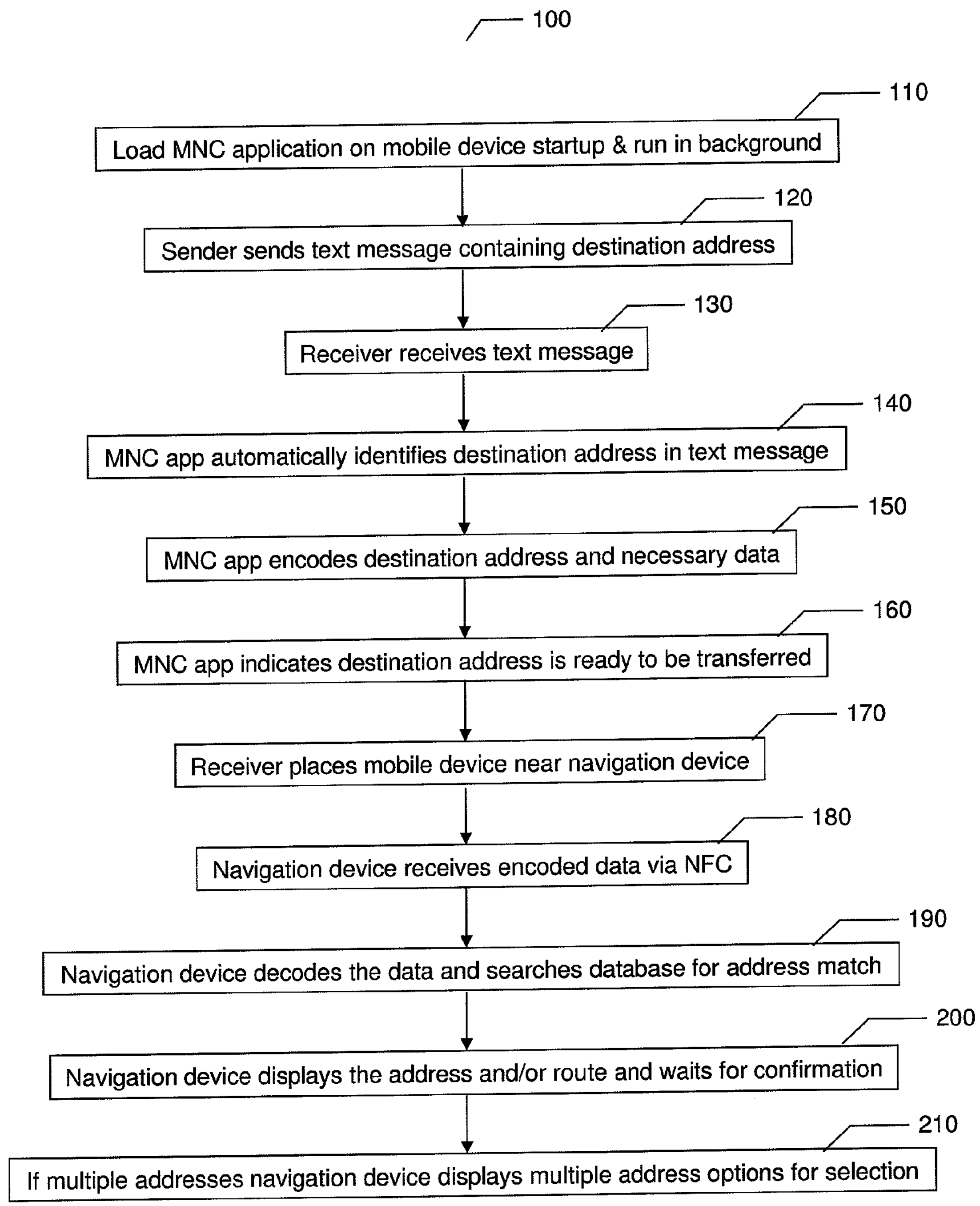
FIG. 2A is a flowchart illustrating a method of a mobile device and navigation device near field communication system according to an embodiment of the present invention.

Refer to FIG. 2A, which is a flowchart illustrating a method of a mobile device and navigation device near field communication system according to an embodiment of the present invention.

The method 100 begins in Step 110 by loading the mobile navigation communication (MNC) application upon startup of the mobile device. The mobile navigation communication application continues to run in the background on the mobile device.

In Step 120 a sender such as, for example, a friend of the driver sends a text message containing a destination address such as, for example, the address of a restaurant. In Step 130 the receiver or driver receives the text message.

The text message is sent and received by a messaging application installed on the mobile device, for example, an SMS application, LINE, WHATSAPP, an instant messaging application, TWITTER, or an email application.

The mobile navigation communication application automatically identifies the destination address in the text message in Step 140. In Step 150 the mobile navigation communication application encodes the destination address and necessary data into a format that the navigation device can decode. The mobile navigation communication application then indicates that the encoded destination address is ready to be transferred in Step 160. For example, the mobile navigation communication application emits a beep or audible sound.

In Step 170 the receiver or driver places the mobile device near the navigation device. In Step 180 the mobile device and the navigation device begin data exchange via NFC and the navigation device receives the encoded data via NFC.

The navigation device decodes the data and searches a database for an address match in Step 190. Then, in Step 200 the navigation device displays the address, and/or the route from the driver's current location to the address and waits for confirmation from the driver. If the navigation device finds multiple addresses in the database, the navigation device displays the multiple address options and waits for selection of desired address in Step 210.

Figure 2B:
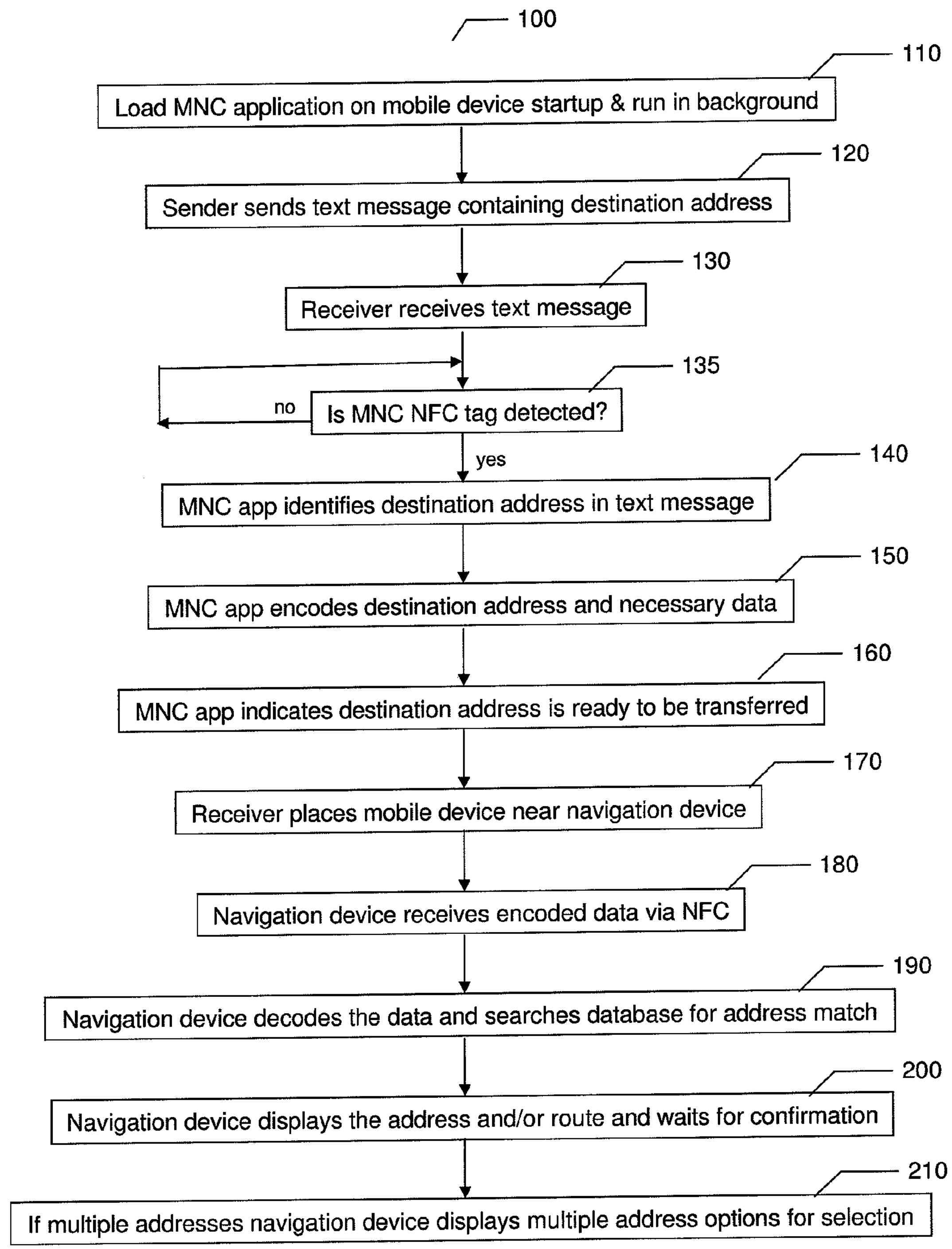
FIG. 2B is a flowchart illustrating a method of a mobile device and navigation device near field communication system according to an embodiment of the present invention.

Refer to FIG. 2B, which is a flowchart illustrating a method of a mobile device and navigation device near field communication system according to an embodiment of the present invention.

The embodiment illustrated in FIG. 2B is similar to the embodiment of FIG. 2A, however in the embodiment illustrated in FIG. 2B the mobile navigation communication application searches for an NFC tag associated with the mobile navigation communication application in Step 135. When the receiver receives a text message in Step 130 the mobile navigation communication application searches for the NFC tag associated with the mobile navigation communication application in Step 135. If the MNC application's NFC tag is discovered the mobile navigation communication application continues to Step 140 and identifies the destination address in the text message. If the MNC application's NFC tag is not discovered the mobile navigation communication application will not continue on until the correct NFC tag is found.

Figure 3:
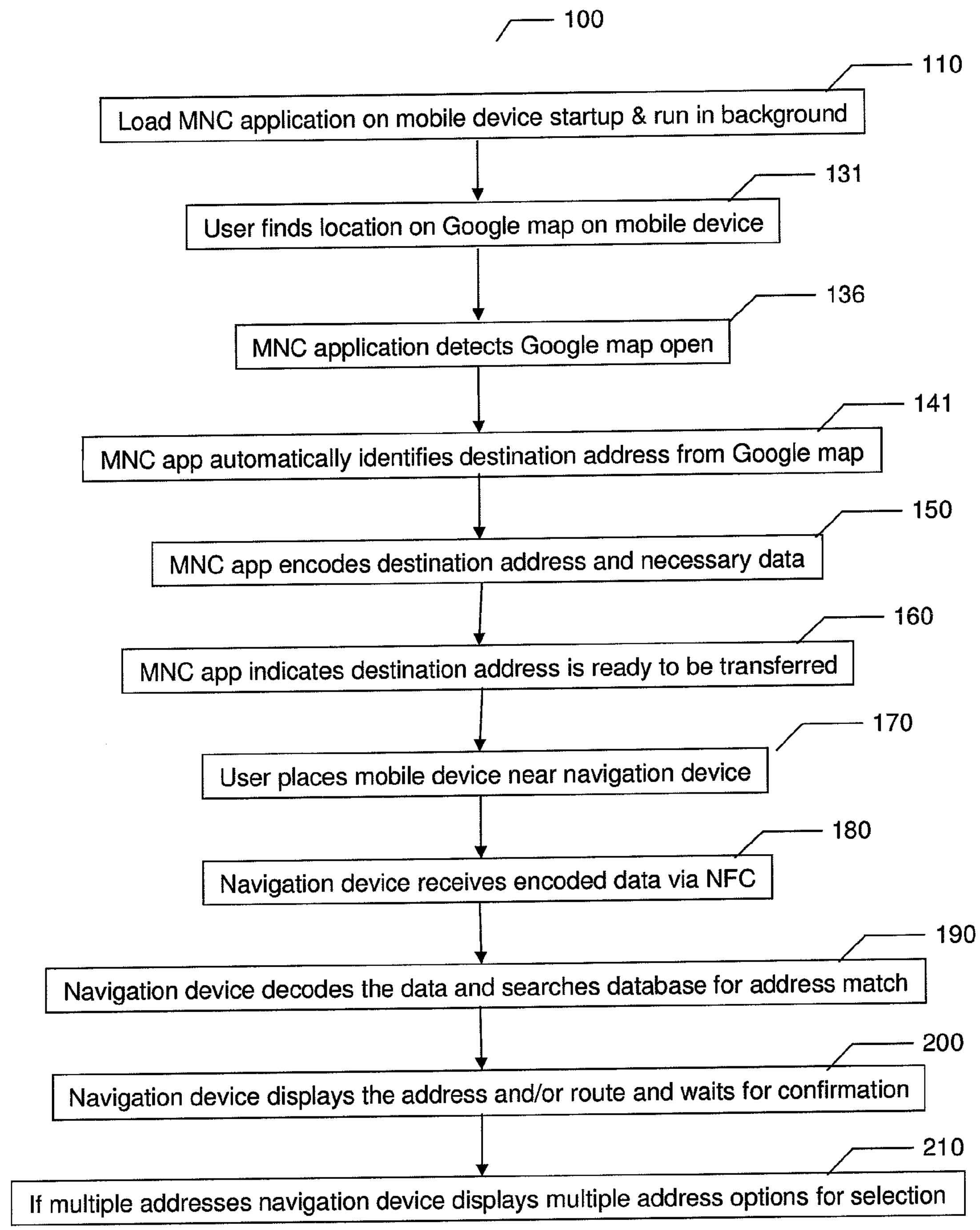
FIG. 3 is a flowchart illustrating a method of a mobile device and navigation device near field communication system according to an embodiment of the present invention.

Refer to FIG. 3, which is a flowchart illustrating a method of a mobile device and navigation device near field communication system according to an embodiment of the present invention.

The method 100 starts in Step 110 by loading the mobile navigation communication (MNC) application upon startup of the mobile device and the MNC application continues running in the background on the mobile device.

In Step 131 the user finds a location on an electronic map such as, for example, a Google map using the mobile device or the user receives an electronic map from another user. The MNC application detects that a Google map is open in Step 136. Then, in Step 141 the MNC application automatically identifies the destination address from the Google map.

The MNC application encodes the destination address and other data if necessary in Step 150 and indicates the encoded destination address is ready to be transferred in Step 160. In Step 170 the user places the mobile device near the navigation device. The mobile device and the navigation device begin data exchange and the navigation device receives the encoded data via NFC in Step 180.

In Step 190 the navigation device decodes the data and searches a database for a match to the address. When an address match is found the navigation device displays the route, the address, and/or driving directions in Step 200. In an embodiment of the present invention the navigation device will wait for confirmation from the user that the address is the desired address before displaying the route. In another embodiment of the present invention the navigation will automatically display the route.

In Step 210 if the navigation device has found multiple addresses in the database that match the decoded address, the navigation device displays the multiple addresses and waits for the user to select the desired address from the list of the multiple addresses.

In this way, the address of the location selected on the Google map is easily transferred to the navigation device and the navigation device is programmed to display the location, route, and driving directions simply by the user placing the mobile device near the navigation device.

Figure 4:
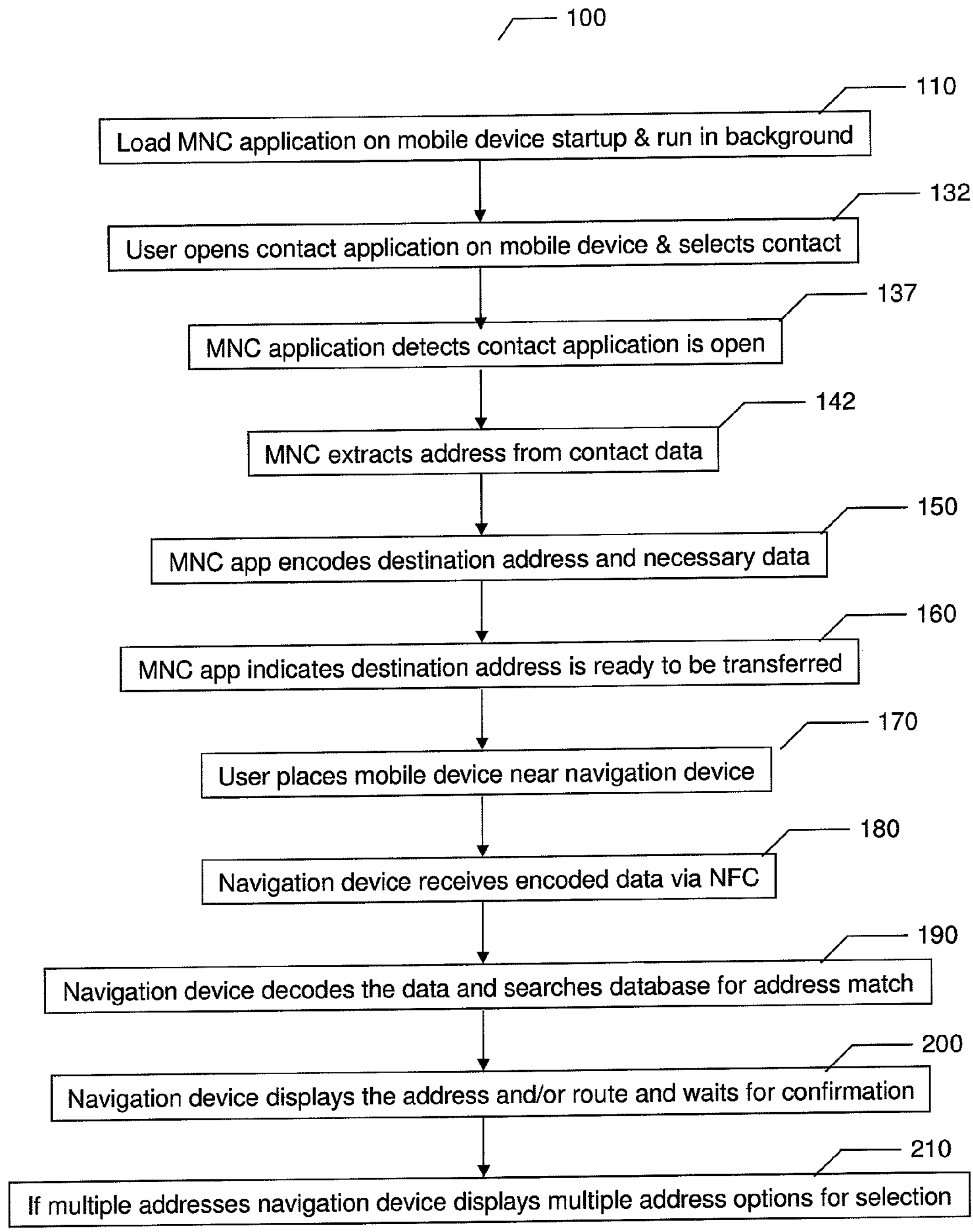
FIG. 4 is a flowchart illustrating a method of a mobile device and navigation device near field communication system according to an embodiment of the present invention.

Refer to FIG. 4, which is a flowchart illustrating a method of a mobile device and navigation device near field communication system according to an embodiment of the present invention.

The method 100 starts in Step 110 by loading the mobile navigation communication (MNC) application upon startup of the mobile device and the MNC application continues running in the background on the mobile device.

In Step 132 a user opens a contact application on the mobile device and selects a desired contact. The contact application displays contact information such as, for example, name, telephone number, email, address, etc. In Step 137 the MNC application detects that the contact application is open and in Step 142 the MNC application extracts the address from the contact data of the selected contact.

The MNC application encodes the destination address and other data if necessary in Step 150 and indicates the encoded destination address is ready to be transferred in Step 160. In Step 170 the user places the mobile device near the navigation device. The mobile device and the navigation device begin data exchange and the navigation device receives the encoded data via NFC in Step 180. In Step 190 the navigation device decodes the data and searches a database for a match to the address. When an address match is found the navigation device displays the route, destination address, and/or driving directions in Step 200. In an embodiment of the present invention the navigation device will wait for confirmation from the user that the address is the desired address.

In Step 210 if the navigation device has found multiple addresses in the database that match the decoded address, the navigation device displays the multiple addresses and waits for the user to select the desired address from the list of the multiple addresses.

In this way, the address of the location of a contact selected in a contact application of the mobile device is easily transferred to the navigation device and the navigation device is programmed to display the location, route, and driving directions simply by the user placing the mobile device near the navigation device.

Figure 5A:
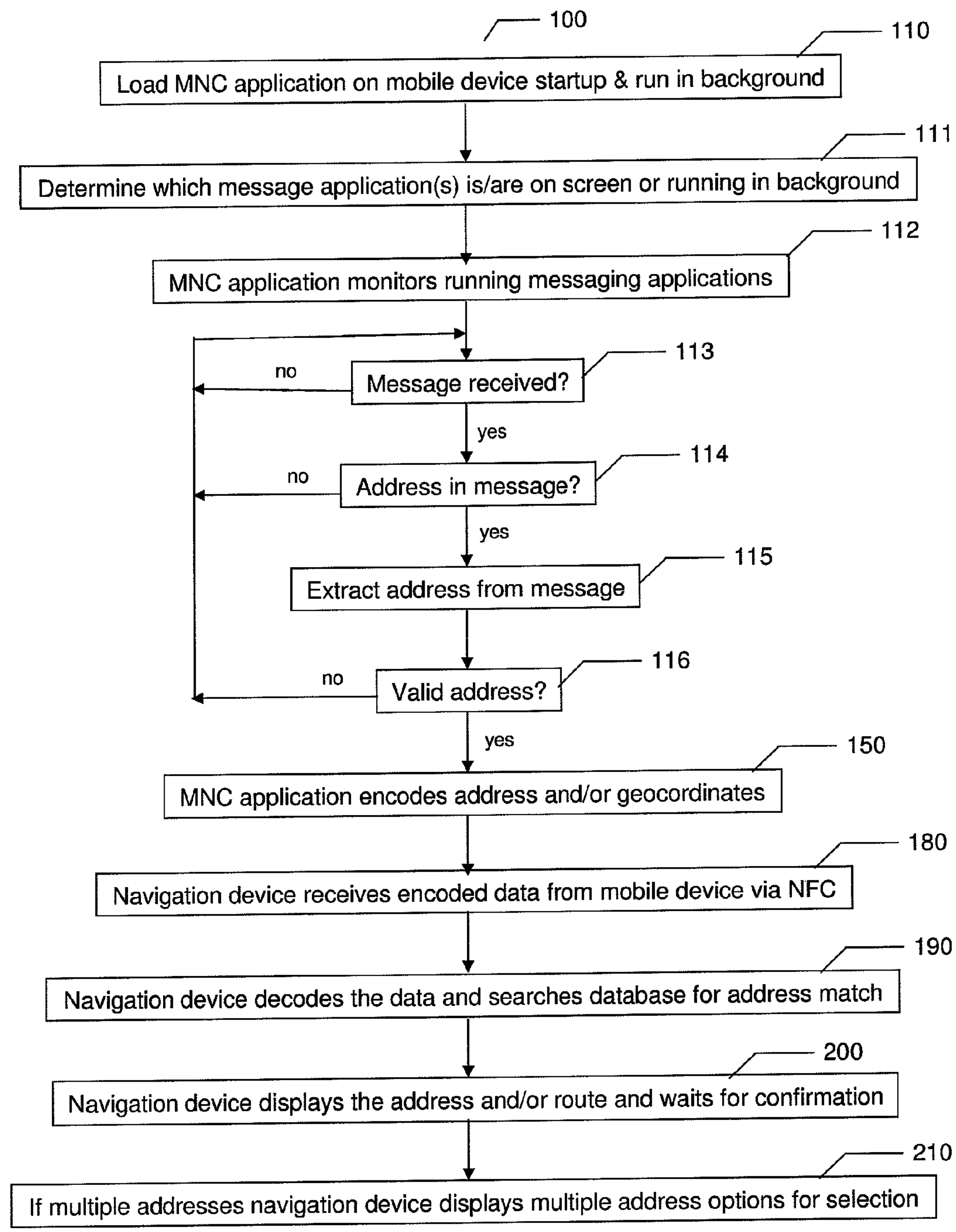
FIG. 5A is a flowchart illustrating a method of a mobile device and navigation device near field communication system according to an embodiment of the present invention.

Refer to FIG. 5A, which is a flowchart illustrating a method of a mobile device and navigation device near field communication system according to an embodiment of the present invention.

The method 100 starts in Step 110 by loading the mobile navigation communication (MNC) application upon startup of the mobile device and the MNC application continues running in the background on the mobile device.

In Step 111 the MNC application determines which message application is or which message applications are on the screen of or running in the background on the mobile device.

In Step 112 the MNC application monitors the running messaging application or applications.

In Step 113 the MNC application determines if a message has been received and if a message has been received proceeds to Step 114. Next, the MNC application determines if the received message contains an address in the message in Step 114. If the received message doesn't contain an address the method returns to Step 113. If the received message contains an address the method proceeds to Step 115 and the MNC application extracts the address from the received message in Step 115.

In Step 116 the MNC application determines if the extracted address is valid. If the address is not valid the method returns to Step 113. If the address is valid the method proceeds to Step 150.

In Step 150 the MNC application encodes the address and/or necessary data such as geocoordinates. The encoded data is then transferred from the mobile device to the navigation device via NFC in Step 180. The navigation device decodes the received data and searches the database for an address match in Step 190.

In Step 200 the navigation device displays the address, route, and/or driving directions. If more than one address in the database matches the decoded address the navigation device displays the multiple addresses in Step 210.

Figure 5B:
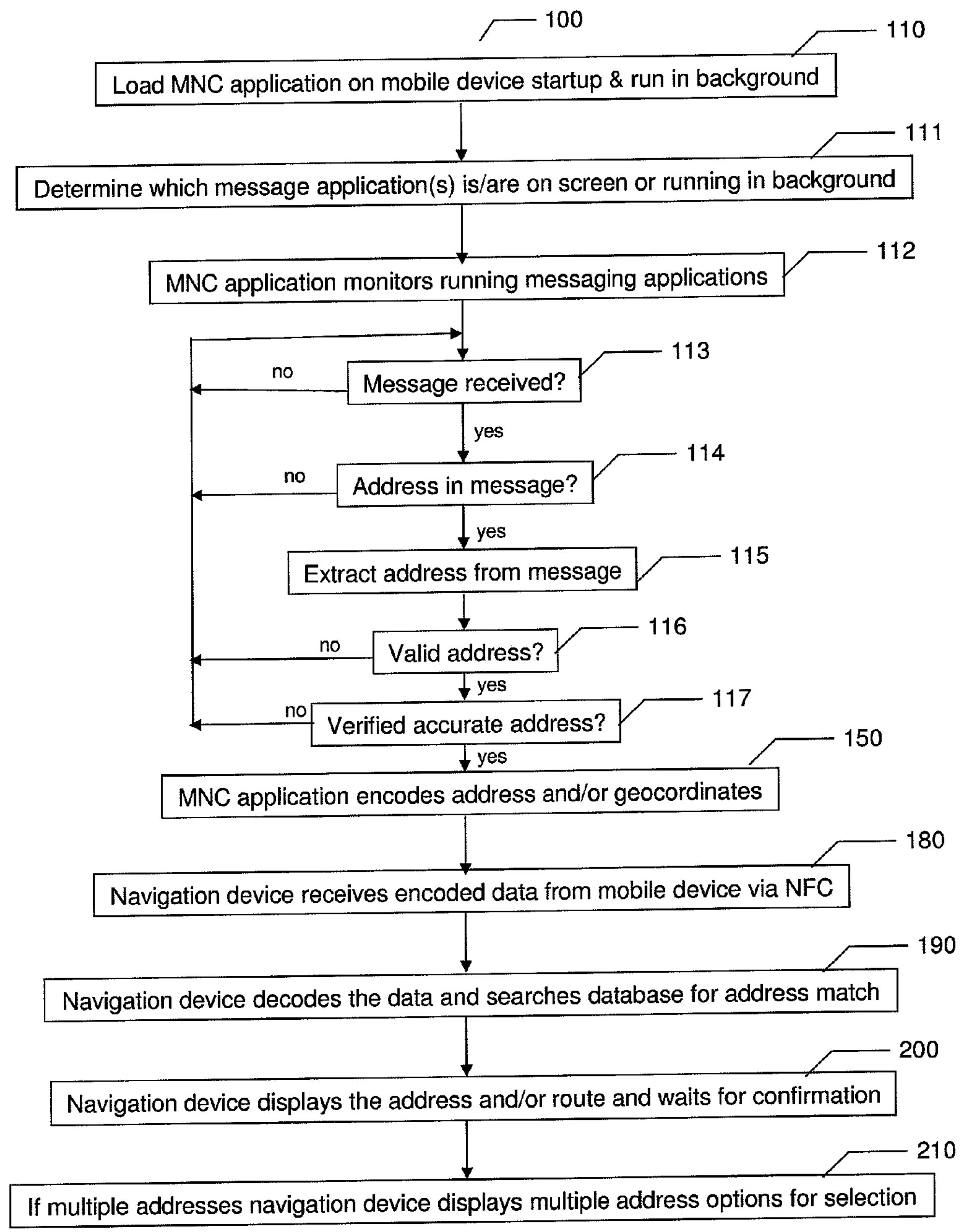
FIG. 5B is a flowchart illustrating a method of a mobile device and navigation device near field communication system according to an embodiment of the present invention.

Refer to FIG. 5B, which is a flowchart illustrating a method of a mobile device and navigation device near field communication system according to an embodiment of the present invention.

The embodiment illustrated in FIG. 5B is similar to the embodiment illustrated in FIG. 5A, however, the embodiment illustrated in FIG. 5B further comprises a step of verifying the accuracy of the address.

After the extracted address has been determined to be valid in Step 116, the MNC application proceeds to verify that the address is accurate in Step 117. If the address is not verified as accurate the method returns to Step 113. If the address is verified to be accurate in Step 117 the method proceeds to Step 150.

Figure 6:
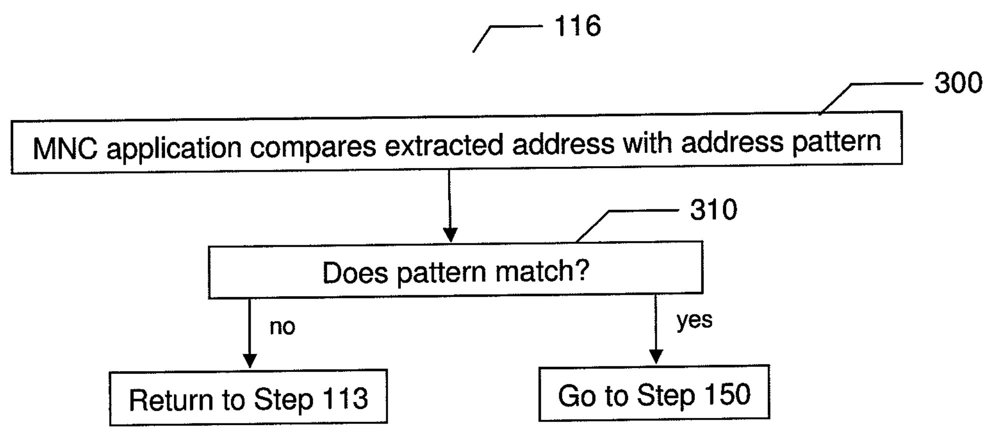
FIG. 6 is a flowchart illustrating a method of validating an address of a mobile device and navigation device near field communication system according to an embodiment of the present invention.

Refer to FIG. 6, which is a flowchart illustrating a method of validating an address of a mobile device and navigation device near field communication system according to an embodiment of the present invention.

The method 116 illustrates an expansion of Step 116 of FIGS. 5A and 5B. In Step 300 the MNC application compares the extracted address with an address pattern. In Step 310 the MNC application determines whether or not the extracted address matches the address pattern. If the extracted address matches the address pattern the method proceeds to Step 150 (FIG. 5A, FIG. 5B). If the extracted address does not match the address pattern the method returns to Step 113 (FIG. 5A, FIG. 5B).

In this embodiment the pattern match procedure comprises using an expression to determine if the pattern of the incoming message matches the pattern.

For example, if the incoming message is "GAP store address is 2373 Broadway New York, N.Y. 10024 Let's meet at 7:00". The expression used to find the pattern of an U.S. address is "/^([^]+)\s*(.+)\s+([^,]+),\s*([^]+)\s*(.+)\s*(.+)/im". The new string after being processed is "GAP store address is 2373 Broadway New York N.Y. 10024".

If the extracted address matches the address pattern the method proceeds to Step 150 (FIG. 5A, FIG. 5B). If the extracted address does not match the address pattern the method returns to Step 113 (FIG. 5A, FIG. 5B).

Utilizing different patterns allows for flexibility in design and functionality as well as being adaptable for different countries and different address patterns.

Figure 7:
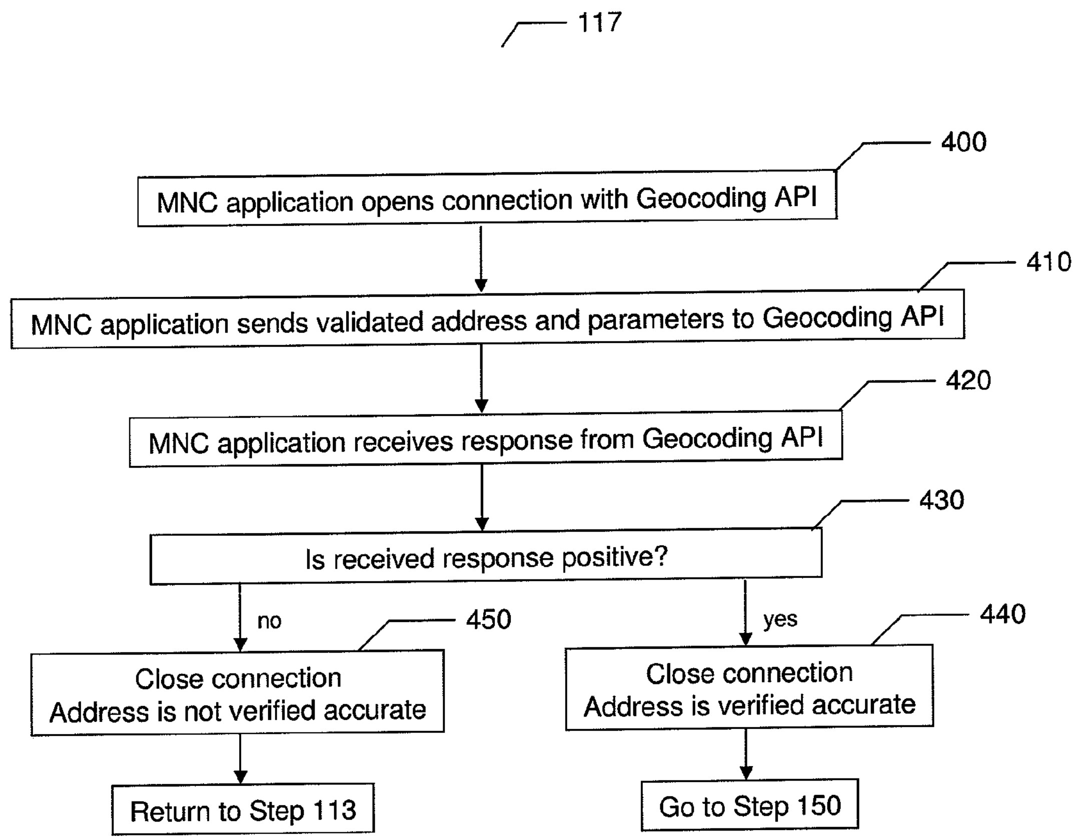
FIG. 7 is a flowchart illustrating a method of verifying accuracy of an address of a mobile device and navigation device near field communication system according to an embodiment of the present invention.

Refer to FIG. 7, which is a flowchart illustrating a method of verifying accuracy of an address of a mobile device and navigation device near field communication system according to an embodiment of the present invention.

The method 117 illustrates an expansion of Step 117 of FIGS. 5A and 5B. In Step 400 the MNC application opens a connection with a Geocoding API. For example, the MNC application accesses Geoogle Maps API's Geocoding via an HTTP or HTTPS request. In Step 410 the MNC application sends the validated address and parameters to the Geocoding API.

In Step 420 the MNC application receives a response from the Geocoding API. The MNC application determines if the received response is positive or not in Step 430. If the response is positive the MNC application closes the connection with the Geocoding API and the address is verified to be accurate in Step 440 and the method proceeds to Step 150 (FIGS. 5A and 5B). If the response is not positive the MNC application closes the connection with the Geocoding API and the address is not verified to be accurate in Step 450 and the method returns to Step 113 (FIGS. 5A and 5B).

For example, to verify the accuracy of an address, the new string is verified by Google Maps API's Geocoding. Geocoding is the process of converting an address into geographic coordinates. Google Maps API's Geocoding can be accessed via HTTP or HTTPS request.

To access a geocoder via an HTTP request:

http://maps.googleapis.com/maps/api/geocode/output-?parameters

The parameters include:

address—The address that you want to geocode.

region—The region code (The default region is set to United States)

components—The component filters, separated by a pipe (|)

The components that can be filtered include:

route matches long or short name of a route.

locality matches against both locality and sublocality types.

administrative_area matches all the administrative_area levels.

postal_code matches postal_code and postal_code_prefix.

country matches a country name or a two letter ISO 3166-1 country code

For example, to validate "1600 Amphitheatre Parkway, Mountain View, Calif." via Geocoding API:

http://maps.googleapis.com/maps/api/geocode/json?address=1600+Amphitheatre+Parkway,+Mountain+View,+CA&sensor=true_or_false The MNC application receives a response from Google Map Geocoding server. If the returned status code is "OK", the MNC application closes the http connection and the address is verified to be accurate in Step 440 and the method proceeds to Step 150 (FIGS. 5A and 5B).

For example, the response returned by Google Geocoding on "1600 Amphitheatre Parkway, Mountain View, Calif.":

```
{
  "results" : [
    {
      "address_components" : [
        {
          "long_name" : "1600",
          "short_name" : "1600",
          "types" : [ "street_number" ]
        },
        {
          "long_name" : "Amphitheatre Pkwy",
          "short_name" : "Amphitheatre Pkwy",
          "types" : [ "route" ]
        },
        {
          "long_name" : "Mountain View",
          "short_name" : "Mountain View",
          "types" : [ "locality", "political" ]
        },
        {
          "long_name" : "Santa Clara",
          "short_name" : "Santa Clara",
          "types" : [ "administrative_area_level_2", "political" ]
        },
        {
          "long_name" : "California",
          "short_name" : "CA",
          "types" : [ "administrative_area_level_1", "political" ]
        },
        {
```

-continued

```
            "long__name" : "United States",
            "short__name" : "US",
            "types" : [ "country", "political" ]
          },
          {
            "long__name" : "94043",
            "short__name" : "94043",
            "types" : [ "postal__code" ]
          }
        ],
        "formatted__address" : "1600 Amphitheatre Pkwy,
        Mountain View, CA 94043, USA",
        "geometry" : {
          "location" : {
            "lat" : 37.42291810,
            "lng" : -122.08542120
          },
          "location__type" : "ROOFTOP",
          "viewport" : {
            "northeast" : {
              "lat" : 37.4242670802914 9,
              "lng" : -122.0840722197085
            },
            "southwest" : {
              "lat" : 37.42156911970850,
              "lng" : -122.0867701802915
            }
          }
        },
        "types" : [ "street__address" ]
      }
    ],
    "status" : "OK"
}
```

If the status code is not "OK", the MNC application will close the http connection, prompt an alarm and go back to standby mode. In this embodiment, if the response is not positive the MNC application closes the connection with the Geocoding API and the address is not verified to be accurate in Step 450 and the method returns to Step 113 (FIGS. 5A and 5B).

Figure 8:
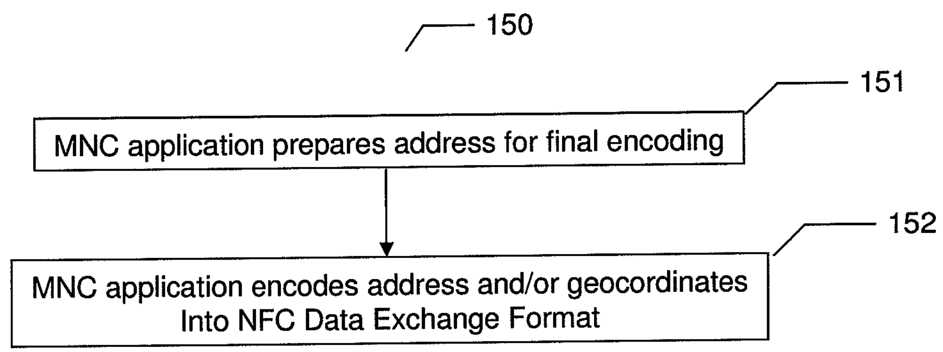
FIG. 8 is a flowchart illustrating a method of encoding address data of a mobile device and navigation device near field communication system according to an embodiment of the present invention.

Refer to FIG. 8, which is a flowchart illustrating a method of encoding address data of a mobile device and navigation device near field communication system according to an embodiment of the present invention.

The method 150 begins in Step 151 by preparing the address for final encoding. For example, the address used is the address that was previously validated or verified or is an abbreviated form of the full validated or verified address. For example, in certain instances the full form of the address is not required and an abbreviated form of the address without the extraneous data is used.

In Step 152 the MNC application encodes the address and/or geocordinates into the NFC data exchange format.

For example, utilizing the NDEF record which is stored as the first record inside an NDEF Message to encode the address:

```
public NdefRecord createTextRecord(String payload, Locale locale,
boolean encodeInUtf8) {
    byte[ ] langBytes = locale.getLanguage( ).getBytes
    (Charset.forNaine("US-ASCII"));
    Charset utfEncoding = encodeInUtf8 ? Charset.forName("UTF-8") :
    Charset.forName("UTF-16");
    byte[ ] textBytes = payload.getBytes(utfEncoding);
    int utfBit = encodeInUtf8 ? 0 : (1 << 7);
    char status = (char) (utfBit + langBytes.length);
    byte[ ] data = new byte[1 + langBytes.length + textBytes.length];
    data[0] = (byte) status;
    System.arraycopy(langBytes, 0, data, 1, langBytes.length);
    System.arraycopy(textBytes, 0, data, 1 + langBytes.length,
    textBytes.length);
    NdefRecord record = new
    NdefRecord(NdefRecord.TNF__WELL__KNOWN,
    NdefRecord.RTD__TEXT, new byte[0], data);
    return record;
}
```

Note that in the above example the string "payload" will be the address.

Figure 9:
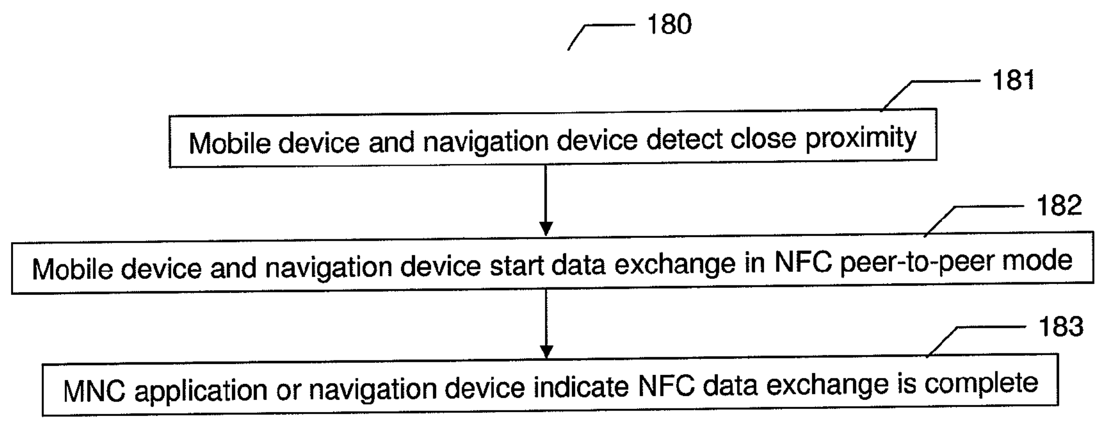
FIG. 9 is a flowchart illustrating a method of data exchange of a mobile device and navigation device near field communication system according to an embodiment of the present invention.

Refer to FIG. 9, which is a flowchart illustrating a method of data exchange of a mobile device and navigation device near field communication system according to an embodiment of the present invention.

The method 180 illustrates an expansion of Step 180 of FIGS. 5A and 5B. In Step 181 the mobile device and the navigation device detect that the two devices are in close proximity to each other. In Step 182 the mobile device and the navigation device start exchanging the encoded data in NFC peer-to-peer mode. When the data exchange is complete the MNC application and/or the navigation device indicates by, for example, emitting an audible sound or displaying a message in Step 183.

In an embodiment of the present invention, when the navigation device receives NDEF Messages and responses to them, for example, if the navigation device is powered by Android OS and the NFC capable mobile device and navigation device communication system application is installed with the following intent filter, the mobile device and navigation device communication system application is started when the navigation device receives an Android Beam or when an NDEF formatted message contains a MIME record of type application/com.myCompany.android.beam.

```
<intent-filter>
  <action android:name="android.nfc.action.NDEF__DISCOVERED" />
  <category android:name="android.intent.category.DEFAULT" />
  <data android:mimeType="application/com.myCompany.android.beam"
/>
</intent-filter>
```

In an embodiment of the present invention when the navigation device decodes the NDEF message, for example, if the navigation device is powered by android OS, the following example checks for the ACTION_NDEF_DISCOVERED intent and gets the NDEF messages.

```
    public void onResume( ) {
        super.onResume( );
        ...
        if
    (NfcAdapter.ACTION__NDEF__DISCOVERED.equals
    (getIntent( ).getAction( ))) {
            Parcelable[ ] rawMsgs =
    intent.getParcelableArrayExtra
    (NfcAdapter.EXTRA__NDEF__MESSAGES);
            if (rawMsgs != null) {
                msgs = new NdefMessage[rawMsgs.length];
            for (int i = 0; i < rawMsgs.length; i++) {
                msgs[i] = (NdefMessage) rawMsgs[i];
            }
        }
    }
    //process the msgs array
```

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A mobile device and navigation device communication method comprising:

receiving a text message by the mobile device;

identifying an address in the text message by a mobile navigation communication application on the mobile device;

encoding the address into a near field communication data exchange format by the mobile navigation communication application;

transferring the address from the mobile device to the navigation device via near field communication;

decoding the address by the navigation device; and displaying the address by the navigation device.

2. The mobile device and navigation device communication method of claim 1, further comprising:

detecting a near field communication tag associated with the mobile navigation communication application after receiving the text message.

3. The mobile device and navigation device communication method of claim 1, further comprising:

validating the address before encoding if the address matches an address pattern.

4. The mobile device and navigation device communication method of claim 1, further comprising:

verifying the address before encoding by receiving a positive response for an address verification request from a geocoding server.

5. The mobile device and navigation device communication method of claim 1, wherein the address is transferred in near field communication peer-to-peer mode.

6. The mobile device and navigation device communication method of claim 1, wherein the mobile navigation communication application is loaded on startup of the mobile device and continues running while the mobile device is turned on.

7. The mobile device and navigation device communication method of claim 1, wherein the text message comprises a short message service message, an instant message, a TWITTER message, an email, a LINE message, a WHATSUP message, driving directions from an electronic map, or contact information from a contact application.

8. The mobile device and navigation device communication method of claim 1, further comprising:

searching the address in a database to find an address match prior to displaying the address by the navigation device.

9. The mobile device and navigation device communication method of claim 8, wherein the navigation device displays a plurality of addresses that matched if more than one address matched while searching the database.

10. A mobile device and navigation device communication method comprising:

loading a mobile navigation communication application on the mobile device on startup of the mobile device;

running in background the mobile navigation communication application;

monitoring messaging applications running on the mobile device by the mobile navigation communication application;

receiving a text message by the mobile device;

determining if the text message comprises an address by the mobile navigation communication application;

extracting the address from the text message by the mobile navigation communication application;

validating the address by the mobile navigation communication application;

verifying the address is accurate by the mobile navigation communication application;

encoding the address by the mobile navigation communication application;

transferring the address from the mobile device to the navigation device using near field communication;

decoding the address by the navigation device;

searching the address in a database to find an address match by the navigation device; and displaying the address match by the navigation device.

11. The mobile device and navigation device communication method of claim 10, further comprising:

detecting a near field communication tag associated with the mobile navigation communication application after receiving the text message.

12. The mobile device and navigation device communication method of claim 10, wherein the address is validated if the address matches an address pattern.

13. The mobile device and navigation device communication method of claim 10, wherein the address is verified accurate by the mobile navigation communication application sending an address verification request to a geocoding server and receiving a positive response from the geocoding server.

14. The mobile device and navigation device communication method of claim 10, wherein the address is encoded into a near field communication data exchange format.

15. The mobile device and navigation device communication method of claim 10, wherein the address is transferred in near field communication peer-to-peer mode.

16. The mobile device and navigation device communication method of claim 10, wherein the text message comprises a short message service message, an instant message, a TWITTER message, an email, a LINE message, a WHATSUP message, driving directions from an electronic map, or contact information from a contact application.

17. The mobile device and navigation device communication method of claim 10, wherein the navigation device displays a plurality of addresses matched while searching the database.

18. A mobile device and navigation device communication method comprising:

loading a mobile navigation communication application on the mobile device on startup of the mobile device;

running in background the mobile navigation communication application;

monitoring messaging applications running on the mobile device by the mobile navigation communication application;

receiving a text message by the mobile device;

detecting a near field communication tag associated with the mobile navigation communication application;

determining if the text message comprises an address by the mobile navigation communication application;

extracting the address from the text message by the mobile navigation communication application;

validating the address if the address matches an address pattern by the mobile navigation communication application;

verifying the address is accurate by the mobile navigation communication application sending an address verification request to a geocoding server and receiving a positive response from the geocoding server;

encoding the address into a near field communication data exchange format by the mobile navigation communication application;

transferring the address from the mobile device to the navigation device using near field communication;

decoding the address by the navigation device;

searching the address in a database to find an address match; and displaying the address match by the navigation device.

19. The mobile device and navigation device communication method of claim 18, wherein the text message comprises a short message service message, an instant message, a TWITTER message, an email, a LINE message, a WHATSUP message, driving directions from an electronic map, or contact information from a contact application.

20. The mobile device and navigation device communication method of claim 18, wherein the navigation device displays a plurality of addresses matched while searching the database.

* * * * *